US008931059B2

(12) United States Patent
Moroney et al.

(10) Patent No.: US 8,931,059 B2
(45) Date of Patent: Jan. 6, 2015

(54) METHOD AND APPARATUS FOR CROSS DRM DOMAIN REGISTRATION

(75) Inventors: Paul Moroney, La Jolla, CA (US); Rafie Shamsaasef, San Diego, CA (US)

(73) Assignee: Google & Technology Holdings LLC, Mountain View, CA (US)

( * ) Notice: Subject to any disclaimer, the term of this patent is extended or adjusted under 35 U.S.C. 154(b) by 0 days.

(21) Appl. No.: 13/177,522

(22) Filed: Jul. 6, 2011

(65) Prior Publication Data
US 2012/0011571 A1   Jan. 12, 2012

Related U.S. Application Data

(60) Provisional application No. 61/361,756, filed on Jul. 6, 2010.

(51) Int. Cl.
*G06F 21/20* (2006.01)
*H04N 21/436* (2011.01)
*G06F 21/10* (2013.01)
*H04N 21/4405* (2011.01)
*H04N 21/4623* (2011.01)

(52) U.S. Cl.
CPC .......... *H04N 21/43615* (2013.01); *G06F 21/10* (2013.01); *H04N 21/4405* (2013.01); *H04N 21/4623* (2013.01); *G06F 2221/0706* (2013.01); *G06F 2221/0759* (2013.01)
USPC ................................................. 726/4; 726/10

(58) Field of Classification Search
CPC ...................... H04L 2209/603; H04L 2209/60
See application file for complete search history.

(56) References Cited

U.S. PATENT DOCUMENTS

| | | | | |
|---|---|---|---|---|
| 7,203,966 B2* | 4/2007 | Abburi et al. | .................... | 726/29 |
| 7,376,976 B2* | 5/2008 | Fierstein et al. | ................ | 726/27 |
| 7,870,273 B2* | 1/2011 | Watson et al. | ................ | 709/229 |
| 7,899,187 B2* | 3/2011 | Messerges et al. | ........... | 380/279 |
| 7,912,076 B2* | 3/2011 | Kim et al. | ...................... | 370/401 |
| 7,996,486 B2* | 8/2011 | Lambert | ....................... | 709/217 |
| 8,160,081 B2* | 4/2012 | Bae et al. | ....................... | 370/401 |
| 8,166,508 B2* | 4/2012 | Mitsuji et al. | ................... | 725/93 |
| 8,527,764 B2* | 9/2013 | Kiran et al. | .................... | 713/169 |
| 2002/0157002 A1* | 10/2002 | Messerges et al. | ........... | 713/155 |
| 2003/0084306 A1* | 5/2003 | Abburi et al. | ................. | 713/188 |
| 2004/0103312 A1* | 5/2004 | Messerges et al. | ........... | 713/201 |
| 2005/0091507 A1* | 4/2005 | Lee et al. | ...................... | 713/182 |
| 2005/0172127 A1* | 8/2005 | Hartung et al. | ............... | 713/167 |

(Continued)

FOREIGN PATENT DOCUMENTS

WO   2006083137 A1   8/2006

OTHER PUBLICATIONS

PCT Search Report & Written Opinion, RE: Application #PCT/US2011/043107; Oct. 7, 2011.

(Continued)

*Primary Examiner* — Michael R Vaughan
(74) *Attorney, Agent, or Firm* — Amin, Turocy & Watson, LLP

(57) ABSTRACT

A content moving device may provide content to plurality of different user devices using a plurality of different DRM systems. The content moving device provides for registration of the DRM systems associated with the user devices. The content moving device may verify a user device by a DRM ID associated with the user device. A domain size may be used to limit the number of content user devices that may be approved for access.

21 Claims, 5 Drawing Sheets

(56) References Cited

U.S. PATENT DOCUMENTS

| | | |
|---|---|---|
| 2006/0021065 A1* | 1/2006 | Kamperman et al. .......... 726/28 |
| 2007/0294170 A1* | 12/2007 | Vantalon et al. ................. 705/50 |
| 2008/0271165 A1* | 10/2008 | Schnell et al. ................... 726/30 |
| 2009/0089884 A1* | 4/2009 | Watson et al. ................... 726/28 |
| 2009/0125987 A1* | 5/2009 | Irwin ................................. 726/4 |
| 2009/0165080 A1 | 6/2009 | Fahn et al. |
| 2009/0178070 A1* | 7/2009 | Mitsuji et al. ..................... 725/4 |
| 2010/0082489 A1* | 4/2010 | Lin et al. .......................... 705/59 |
| 2010/0138928 A1 | 6/2010 | Lee et al. |
| 2010/0198944 A1* | 8/2010 | Ho et al. ......................... 709/217 |
| 2010/0235891 A1* | 9/2010 | Oglesbee et al. ................. 726/5 |
| 2010/0269156 A1* | 10/2010 | Hohlfeld et al. .................. 726/4 |
| 2010/0333209 A1* | 12/2010 | Alve ................................ 726/26 |
| 2011/0238985 A1* | 9/2011 | Sovio et al. .................. 713/168 |
| 2013/0007894 A1* | 1/2013 | Dang et al. ...................... 726/27 |

OTHER PUBLICATIONS

Kravitz, et al, "Achieving Media Portability Through Local Content Translation and End-to-End Rights Management", Proceedings of the 5th ACM Workshop on Digital Rights Management; Nov. 7, 2005; pp. 27-36.

Open Mobile Alliance, "OMA.DRM Specification—v2.0.0", ; Jul. 23, 2008.

OMA Open Mobile Alliance, "DRM Architecture—Approved Version 2.1—Oct. 14, 2008—OMA-AD-DRM-V2_1-20081014-A"; Oct. 14, 2008, pp. 1-28.

Safavi-Naini, et al, "Import/Export in Digital Rights Management", ACM Workshop on Digital Rights Management, Oct. 25, 2004, pp. 99-110.

Office Action for Canadian Patent Application Serial No. 2,803,495, dated Apr. 14, 2014, 3 pages.

* cited by examiner

METHOD AND APPARATUS FOR CROSS DRM DOMAIN REGISTRATION

This application claims the benefit of U.S. Provisional Application 61/361,756 filed on Jul. 6, 2010, titled Cross DRM Domain Registration, herein incorporated by reference in its entirety.

FIELD OF INVENTION

The invention relates to a content management device, and more particularly toward a management of a transcoding and storage device.

BACKGROUND

Consumers receive content in various forms using several different devices. For example, consumers may receive video content, e.g. television programs and movie, or audio content, e.g. music, through a set top box (STB) connected to a service provider network. The content may be stored on a digital video recoding (DVR) device at the request of the user, and retained on the DVR for an indefinite period of time, e.g. until deleted by the user. The STB is typically connected to a television device which displays the video content or plays the audio content to the consumer. The typical television device is a non-portable stationary unit inside a household.

Many consumers wish to view his/her content on the go, on his/her mobile device, whenever he/she wishes. The content may be converted (transcoded) from a first format and coding to another format suitable to the consumer's mobile device. However there may be restriction on accessing the content on other devices, e.g. Digital Right Management (DRM) rules may apply. Digital rights management (DRM) is a term for access control technologies that are used by a content provider, such as a hardware manufacturer, a content publisher, a content copyright holder or another content owner. A content provider uses DRM technologies to impose limitations on the use of content or the devices that use the content. DRM is used to describe any technology that inhibits the use of content which is not desired or intended by a content provider. Several types of DRM systems may be used in a consumer's home. Such types of DRM may include Digital Transmission Content Protection over Internet Protocol (DTCP-IP) and Internet Protocol Rights Management (IPRM) by Motorola Mobility, Inc. for example. Each type of DRM may require its own domain registrations. When domain registrations must be processed across more than one DRM, specifically, more than just IPRM, a new domain management approach is required.

SUMMARY OF INVENTION

In accordance with the principles of the invention, an apparatus for moving content from a first user device to a second user device may comprise: a first device interface configured to receive content in a first format from the first user device; a cross domain controller configured to provide a digital rights media (DRM) registration service, wherein the cross domain controller provides DRM registration to a plurality of DRM systems associated with a plurality of user devices.

In the apparatus, the cross domain controller may receive a registration request, a device ID and identification of a DRM system from a user device The cross domain controller may store the device ID and identification of a DRM system in a database.

In accordance with the principles of the invention a method of providing access of content at by one user device to another user device may comprise the steps of: receiving a request to register a user device with a cross domain controller, the request including a device ID and a device (digital rights media) DRM ID; checking a DRM certificate associated with the user device; and registering the user device, wherein a plurality of different DRM systems are registered to receive content from a single user device.

In the method, the step of registering the user device may determine if a predetermined domain size has been exceeded. The method may further comprise the step of determining if a device is previously registered based on a DRM ID associated with the device. The method may further comprise the step of black listing a user device. In the method, the step of registering a device includes an authentication and key exchange process. In method, the authentication and key exchange process may include determining if a device is registered and part of a domain after validating the device and before providing the device with a server exchange key. The method may further comprise the step of assigning a user friendly client name to the user device upon registering the user device.

In accordance with the principles of the invention, a non-transitory computer readable medium may carry instruction for a computer to perform a method of providing access of content at by one user device to another user device comprising the steps of: receiving a request to register a user device with a cross domain controller, the request including a device ID and a device (digital rights media) DRM ID; checking a DRM certificate associated with the user device; and registering the user device, wherein a plurality of different DRM systems are registered to receive content from a single user device.

DETAILED DESCRIPTION OF THE INVENTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

Figure 1:
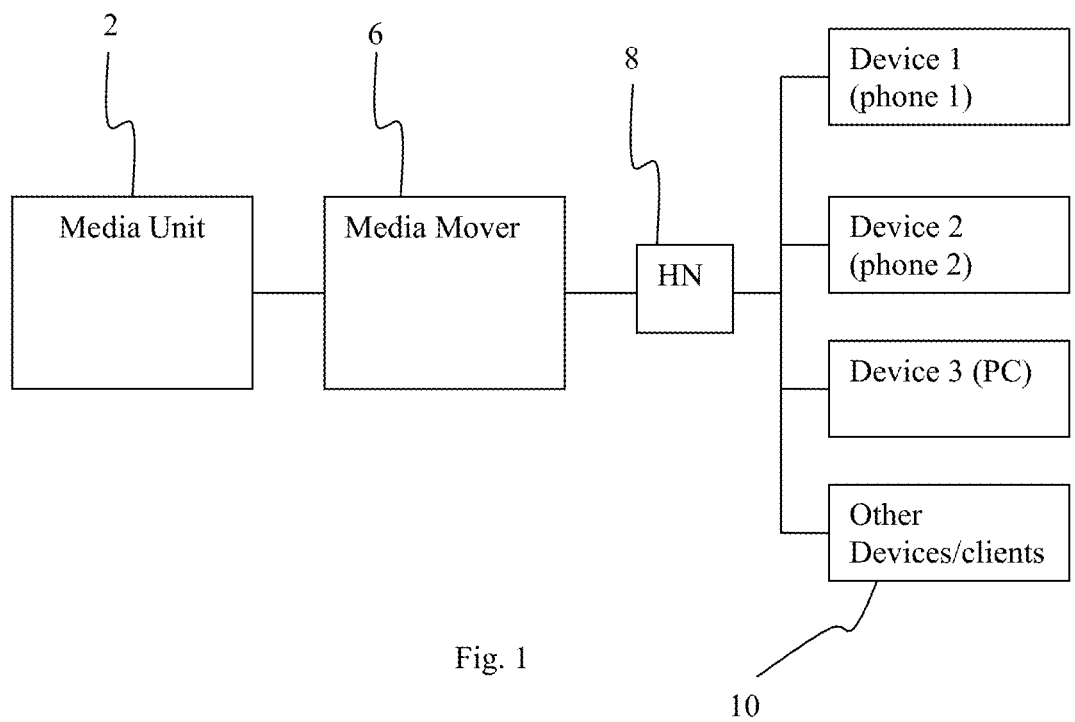
FIG. 1 illustrates an exemplary home network arrangement using a content moving device in accordance with the principles of the invention.

FIG. 1 illustrates an exemplary home network arrangement using a content moving device in accordance with the principles of the invention. The content moving device 6 described herein may be an accessory that is placed between the consumer's media unit 2, such as set top box (STB) (which may include a digital video recorder (DVR)) and a home network 8. A plurality of user devices 10 may also be connected to the home network 8, such as a portable media player (e.g. wireless smart telephone) 1, VoIP phone 2, a PC, and other devices. The content moving device may transcode, that is, convert, the content received from the media unit into another format, such as from MPEG-2 to H.264 AVC.

Content mover device 6 may be connected via an Ethernet, USB, wireless (WiFi or Bluetooth) connection, or any suitable connection. Home network 8 may be in the form of a router connected to the content mover device 6 via an Ethernet connection, a wireless (WiFi), USB data, or other suitable type of connection.

The communication between the content mover device, devices 10 and DVR on the user's home network may be established through a discovery process, such as using UPnP. For example, the content mover device and/or PMP may use UPnP to discover any DVR on the local home network. The content mover device and/or PMP may identify server devices (i.e. DMS) and selects the DVR(s). If there are other source devices such as PCs, the content moving device/PMP may exclude them from future content discovery.

The communications may include video, audio/video (e.g. television programs or movies), audio information, data, and STB control and signaling information. The communications may be a provider network, which may charge for providing communication and content services to the user. The communications may be bi-directional, e.g. downstream from the service provider and upstream from the STB. Typical provider networks include over the air free broadcasts, cable television networks (including optical fiber networks, hybrid fiber coax (HFC) networks, etc.), or satellite television networks. STB 2 preferably received content through the network and provides the content to television (not shown) for display to a user. STB 3 may also record content selected by a user on its associated DVR.

Figure 4:
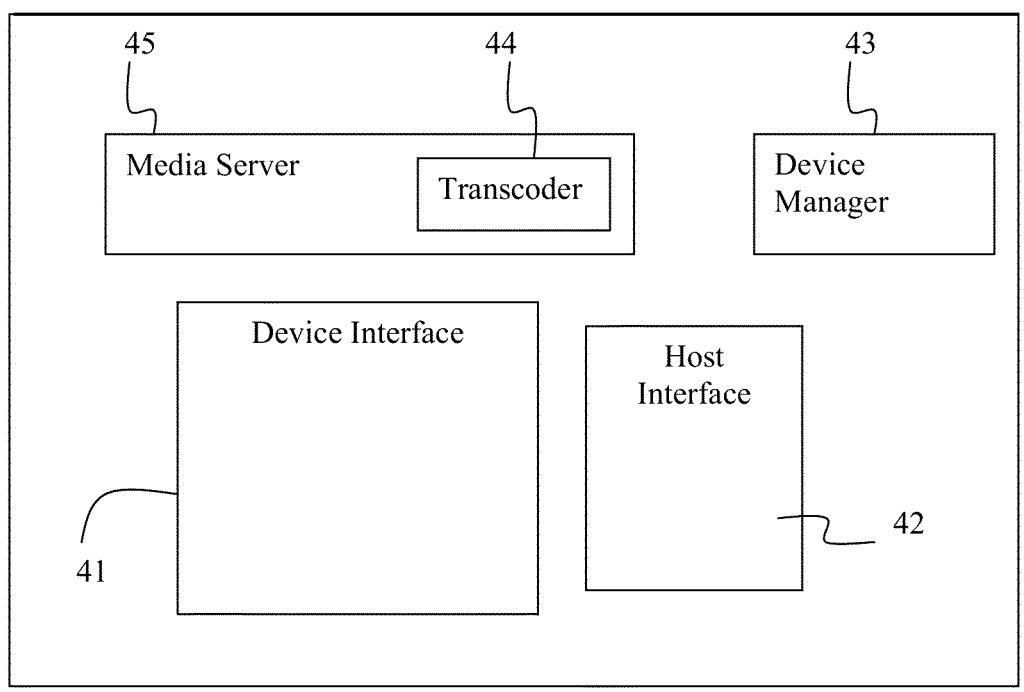
FIG. 4 illustrates an exemplary architecture of a content mover device 6 in accordance with the principles of the invention.

FIG. 4 illustrates an exemplary architecture of a content mover device 6 in accordance with the principles of the invention. As illustrated in FIG. 4, content mover device 6 may include a media server 45 with a transcoder module 44. A device manager 43 may be included to control the operations of content mover device 6. A user/portable device interface unit 41 may be provided to communicate with a desired user/portable devices. The portable device interface unit 41 may include modules for controlling file access, such as XFF or a file allocation table (FAT), SD card access control. Wireless interfaces, e.g. Bluetooth including FTP and CPP modules may be used, as well as a WiFi module with Digital Living Network Alliance (DLNA)/Universal Plug and Play (UPnP) Content Directory Service (CDS), TCP/IP and HTTP protocols. A host interface module 42 may include a USB slave, CDC, TCP/IP, HTTP server, and Simple Object Access Protocol (SOAP) interface modules.

The content moving device may be connected to the media unit 2 on a permanent basis, by Ethernet or some similar home network technology, such as a Media over Coax Alliance (MoCA) standard, e.g. MoCA MAC/PHY v1.0. The Content moving device may be an "invisible" device, with no direct user interaction required, and possibly not even any out-of-box set up at all. An Ethernet connected Content moving device typically requires no mandatory set up, while a WiFi connected Content moving device may require a Service Set Identifier (SSID) and key. The moving device may provide for full automation of the content transcoding and transfer.

The mover 8 may provide the DRM registration service for the various client devices 10. In a preferred approach, the new registration may be as simple as possible, with enforcement tied directly to the specific DRM system used by the client involved.

The mover 6 may have a maximum domain size set to N number of devices which may be registered. A simple register command defines a user friendly name, security scheme, ID, and other client specific information. The ID is preferably certifiable within the context of the domain it comes from (typically a cert). Domain control point makes sure that when a registered client attempts to access content, its ID and cert are checked against the registration list. If it is not present, content access is denied.

Figure 2:
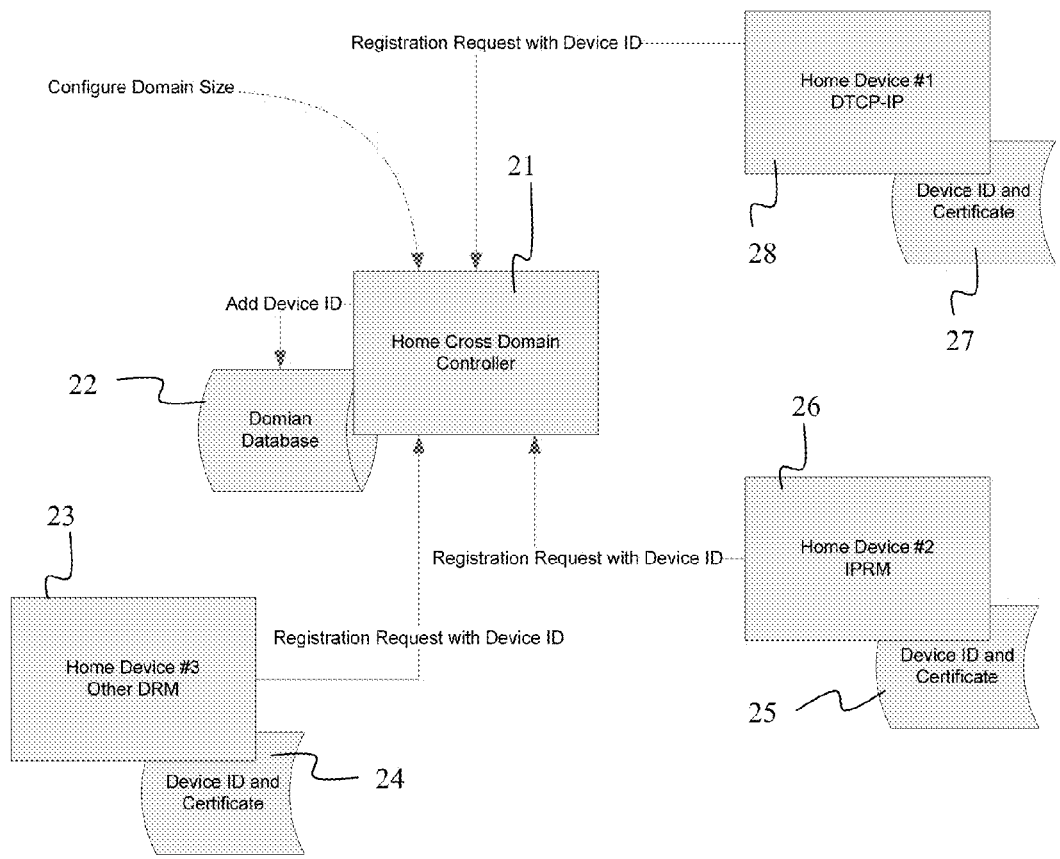
FIG. 2 illustrates a functional operation of the DRM registration in accordance with the invention.

FIGS. 2 and 3 illustrate a functional layout and communication flow of the mover 6 in operation. As shown in FIG. 2, home device 28 may use a DTCP-IP DRM system, with device ID and certificate 27, home device 26 may use an IPRM system with device ID and certificate 25, home device 23 may use another DRM system with associated device ID and certificates 24. A home cross domain controller 21 may use a domain database 22 to store device IDs from the home devices.

Each home device (client) registers with the home cross domain controller using the "Register" Rest API transaction, or the new Register DLNA service. Each client provides in response to the command:

their DRM system [initially IPRM or DTCP-IP];

their DRM ID [the public ID value that is certifiable by checking the DRM certificate, a process that occurs naturally in the course of executing the DRM protocols and cryptography];

a user friendly client name [for referencing on the Mover local configuration web page, which allows easy identification of registered clients to a user, and easy deletion from domain if desired]; and a device profile type [that is, which device profile the client matches, of the choices supported by the Mover].

The mover 6 may respond to the transaction with an ACK or an error code. If the domain size has not been exceeded, the Mover may enter the registered client in its database of N entries, with an additional time-of-registration field.

When a registered client then begins to execute the DRM protocol with mover 6, the appropriate mover DRM stack will supply the verified DRM ID so that the Mover domain control code module can check that the ID is in fact registered. If it is not, the DRM process is aborted for that client, or the negotiated exchange key is disabled or otherwise blocked from use.

Note that the steps above may be additional to any other processing by the specific DRM system any client uses. Thus IPRM on its own manages IPRM clients, due to its Kerberos derived nature, and may be limited to a max of 16 devices connected, and DTCP-IP may be limited 34 devices connected.

Further, as require, if any client exhibits "bad behavior" in so far as its security system is concerned, and is revoked, the mover 6 will discover this from checking the on-line CRL server. In addition, if any client exhibits "bad behavior" regarding its required domain functionality (example: deleting copy once stored content after a time out period) then such a client is black listed. The mover 6 will discover also black list identities when it checks the CRL server.

Figure 3A:
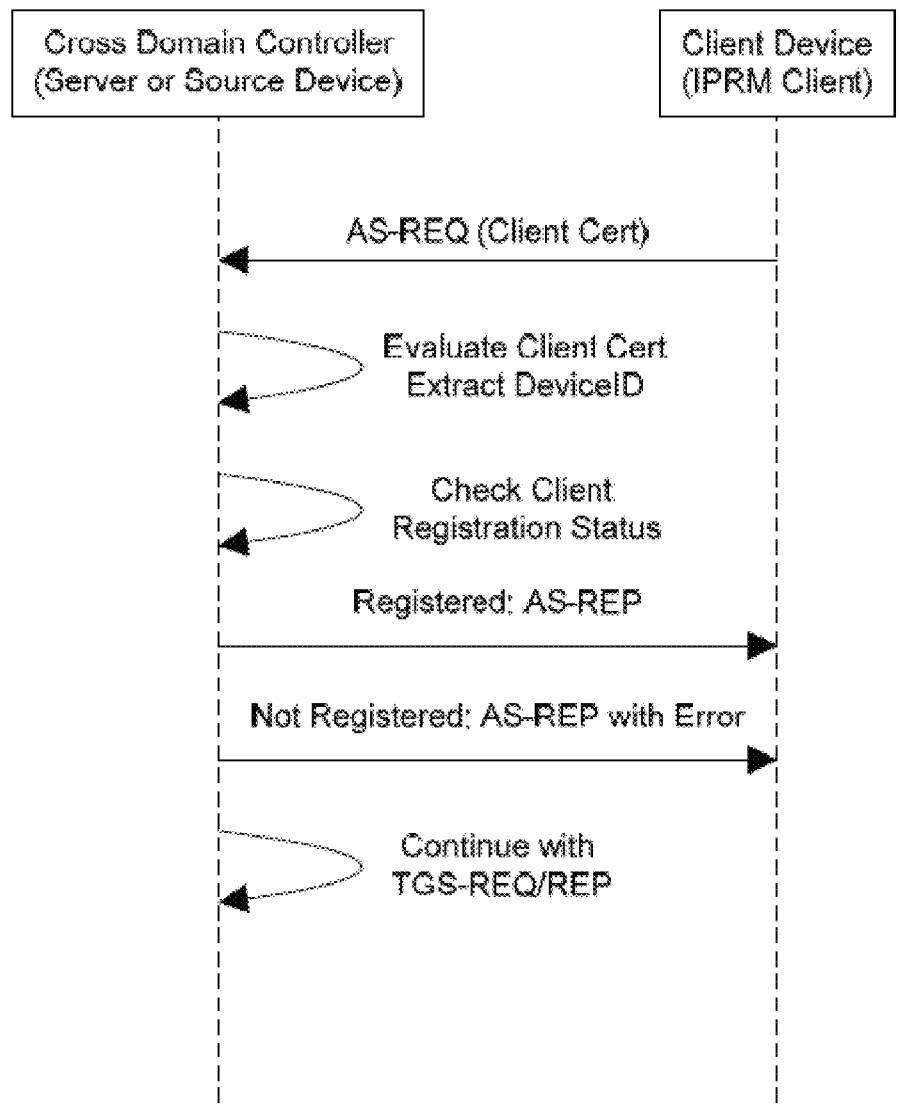
FIGS. 3A and 3B illustrate communication flows for DRM verification.
Figure 3B:
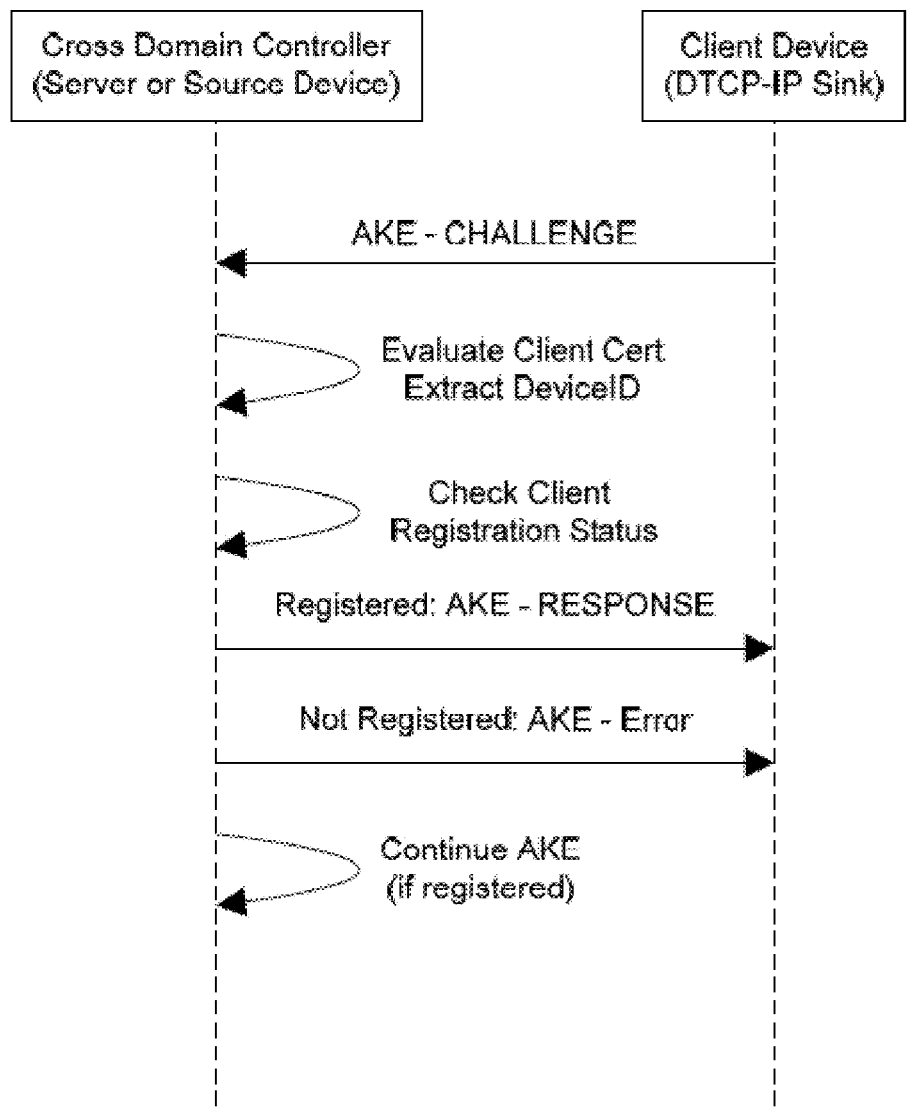

As shown in FIG. 3B, in case of DTCP-IP, we propose to break in the AKE (Authentication and Key Exchange) process to verify whether or not the device is actually already registered and it is part of the domain. This has to happen after validating the device certificate and before providing it with server exchange key. The AKE sequence in accordance with the invention is shown below:

1. Sink sends CHALLENGE, Source responds with ACK
2. Source sends CHALLENGE, Sink responds with ACK
3. Source evaluates Sink's certificate 4. Source checks the domain registration list for the Sink device
5. Not registered case: Source sends RESPONSE with "Sink count limit has been reached" error (DTCP_SINK_COUNT_LIMIT_REACHED-509) to deny its AKE, Sink responds with ACK
6. Registered case: Source sends RESPONSE, Sink responds with ACK
7. Sink sends RESPONSE, Source responds with ACK
8. Continue with Exchange Key process.

As shown in FIG. 3A for the IPRM case, an IPRM client sends AS-REQ (or combined with TGT-REQ) to IPRM Home Domain Controller to get an updated ticket. The home domain controller verifies the client device certificate and checks if it belongs to the domain or not. There are two types of client device lists maintained by IPRM: local device list and remote device list. In one implementation, the IPRM home domain controller may only check the local list. In other implementations, the IPRM home domain controller may check a remote device list or both lists.

In another implementation, an at KEY-REQ message may be used, which would allow us to drop clients much quicker than waiting for the next AS-REQ.

The content moving device is not only capable to take the content out of a STB for consumption on other devices, it can also take the content from other devices for consumption by a set top box, TV or other devices connected to STB or content moving device via Internet. For example, it can accept and video captured by a video camera of a digital camcorder or a mobile phone, convert it to the format decodable and playable by Set Top box for display on a TV, or decodable and playable by a portable device connected to content moving device by in-home network or Internet. It can also adjust the resolution and bit rate of the video to lower the bandwidth required to send the content on the internet. That content can be consumed by other users far away or loaded on social networking web sites.

Some or all of the operations set forth in FIGS. 2-3B may be contained as a utility, program, or subprogram, in any desired computer readable storage medium, which may be a non-transitory medium. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices. Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

The content mover device enables a user to conveniently and efficiently move user recorded content from one user device (e.g. a DVR) to another user device (e.g. PMP). The other devices may operate with different DRM systems. The content mover device provide the DRM access to the user devices.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What is claimed is:

1. A method comprising:
    receiving, by a cross domain controller including a processor and a memory, a request to register a second user device on a local communication network with the cross domain controller on the local communication network, the request including a device ID and a digital rights management (DRM) ID;
    validating, by the cross domain controller, a DRM certificate associated with the second user device;
    registering, by the cross domain controller, the second user device with the cross domain controller,
    receiving, by the cross domain controller, content from a first user device on the local communication network; and
    providing, by the cross domain controller, access to the content provided by the first user device to the second user device in response to registering the second user device and validating the DRM certificate,
    wherein a plurality of user devices on the local communication network having different DRM systems are registered with the cross domain controller to receive the content provided by the first user device.

2. The method of claim 1, wherein the registering the second user device includes determining if a predetermined domain size has been exceeded, the predetermined domain size being a maximum number of user devices registered with the cross domain controller.

3. The method of claim 1, further comprising determining, by the cross domain controller, if a user device is previously registered with the cross domain controller based on the DRM ID associated with the user device.

4. The method of claim 1, further comprising black listing, by the cross domain controller, a user device based on a predetermined behavior of the user device.

5. The method of claim 1, wherein the registering the second user device includes an authentication and key exchange process.

6. The method of claim 5, wherein the authentication and key exchange process includes determining if the second user device is registered with the cross domain controller and part of a domain after validating the DRM certificate of the second user device and before providing the second user device with a server exchange key.

7. The method of claim 1, further comprising assigning, by the cross domain controller, a client name to the second user device upon registering the second user device with the cross domain controller.

8. A non-transitory computer readable medium having instructions stored thereon that, in response to execution, cause a system including a processor to perform operations comprising:
    receiving a request to register a second user device on a local communication network with a cross domain controller of the computer on the local communication network, the request including a device ID and a digital rights management (DRM) ID;
    validating a DRM certificate associated with the second user device;
    registering the second user device with the cross domain controller;

receiving, at the cross domain controller, content from a first user device on the local communication network; and providing, by the cross domain controller, access to the content provided by the first user device to the second user device in response to registering the second user device and validating the DRM certificate, wherein a plurality of user devices on the local communication network having different DRM systems are registered with the cross domain controller to receive the content provided by the first user device.

9. The non-transitory computer readable medium of claim 8, wherein the registering the second user device includes determining if a predetermined domain size has been exceeded, the predetermined domain size being a maximum number of user devices registered with the cross domain controller.

10. The non-transitory computer readable medium of claim 8, further comprising determining if a user device is previously registered with the cross domain controller based on the DRM ID associated with the user device.

11. The non-transitory computer readable medium of claim 8, further comprising black listing, by the cross domain controller, a user device based on a predetermined behavior of the user device.

12. The non-transitory computer readable medium of claim 8, wherein the registering the second user device includes an authentication and key exchange process.

13. The non-transitory computer readable medium of claim 12, wherein the authentication and key exchange process includes determining if the second user device is registered with the cross domain controller and part of a domain after validating the DRM certificate of the second user device and before providing the second user device with a server exchange key.

14. The non-transitory computer readable medium of claim 8, further comprising assigning a client name to the second user device upon registering the second user device with the cross domain controller.

15. A system, comprising:
a processor; and
a memory communicatively coupled to the processor, the memory having stored therein computer-executable instructions, comprising:
a cross domain controller component configured to:
receive a request to register a second user device on a local communication network with the cross domain controller on the local communication network, the request including a device ID and a digital rights management (DRM) ID;
validate a DRM certificate associated with the second user device;
register the second user device with the cross domain controller,
receive content from a first user device on the local communication network; and
provide access to the content provided by the first user device to the second user device in response to registering the second user device and validating the DRM certificate,
wherein a plurality of user devices on the local communication network having different DRM systems are registered with the cross domain controller to receive the content provided by the first user device.

16. The system of claim 15, wherein the cross domain controller component is further configured to register the second user device based upon a determination whether a predetermined domain size has been exceeded, the predetermined domain size being a maximum number of user devices registered with the cross domain controller.

17. The system of claim 15, wherein the cross domain controller component is further configured to determine whether a user device is previously registered with the cross domain controller based on the DRM ID associated with the user device.

18. The system of claim 15, wherein the cross domain controller component is further configured to black list a user device based on a predetermined behavior of the user device.

19. The system of claim 15, wherein the cross domain controller component is further configured to register the second user device based upon an authentication and key exchange process.

20. The system of claim 19, wherein the authentication and key exchange process includes a determination whether the second user device is registered with the cross domain controller and part of a domain after validating the DRM certificate of the second user device and before providing the second user device with a server exchange key.

21. The system of claim 15, wherein the cross domain controller component is further configured to assign a client name to the second user device upon registering the second user device with the cross domain controller.

\* \* \* \* \*